US008904169B2

(12) United States Patent
Christensen et al.

(10) Patent No.: US 8,904,169 B2
(45) Date of Patent: Dec. 2, 2014

(54) JUST IN TIME TRUST ESTABLISHMENT AND PROPAGATION

(75) Inventors: Aaron Christensen, Golden Valley, MN (US); William Browning, Blaine, MN (US); Gaurav Khanna, Mountain View, CA (US); Sreekanth Vadapalli, Santa Clara, CA (US); Jatheen Anand, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 906 days.

(21) Appl. No.: 12/560,384

(22) Filed: Sep. 15, 2009

(65) Prior Publication Data

US 2011/0066847 A1    Mar. 17, 2011

(51) Int. Cl.
*H04L 29/06*    (2006.01)
*H04L 9/32*    (2006.01)
*H04L 9/00*    (2006.01)

(52) U.S. Cl.
CPC .............. *H04L 9/006* (2013.01); *H04L 9/3263* (2013.01)
USPC ............ 713/156; 713/168; 709/219; 709/229

(58) Field of Classification Search
USPC ........................................................ 726/156
See application file for complete search history.

(56) References Cited

U.S. PATENT DOCUMENTS

| 6,463,534 | B1 * | 10/2002 | Geiger et al. ............... 713/168 |
| 6,892,307 | B1 | 5/2005 | Wood et al. |
| 7,219,154 | B2 * | 5/2007 | Blakley et al. ................ 709/229 |
| 7,444,666 | B2 * | 10/2008 | Edwards et al. .................. 726/1 |
| 7,478,236 | B2 * | 1/2009 | Roh et al. ...................... 713/157 |
| 7,571,314 | B2 * | 8/2009 | Lortz .............................. 713/157 |
| 7,797,534 | B2 * | 9/2010 | Rits .................................. 713/156 |
| 7,827,156 | B2 * | 11/2010 | Waxman et al. ............... 707/694 |
| 2002/0091757 | A1 * | 7/2002 | Cuomo et al. .................. 709/203 |
| 2003/0023880 | A1 * | 1/2003 | Edwards et al. ................ 713/201 |
| 2003/0115342 | A1 * | 6/2003 | Lortz .............................. 709/229 |

(Continued)

FOREIGN PATENT DOCUMENTS

JP    2004234189 A    1/2003

OTHER PUBLICATIONS

PCT/US 10/48993 Search Report and Written Opinion concerning counterpart PCT application, 7 pages, Dec. 2010, Symantec Corporation.

(Continued)

*Primary Examiner* — Oscar Louie
*Assistant Examiner* — Henry Tsang
(74) *Attorney, Agent, or Firm* — Brill Law Office; Jeffrey Brill

(57) ABSTRACT

Trust relationships in an online service system are established at a domain level, and propagated to components of domains as they attempt cross domain communication. In attempting to communicate across domains, a first component in a first domain attempts to validate a certificate of a second component in a second domain. Where the attempt to validate the certificate indicates that a trust relationship does not exist between the first component and the second domain, the first component determines whether a domain level trust relationship exists between the two domains. The first component propagates the trust status between the first and second domains to itself. If there is an existing trust relationship between the first and second domains, the first component validates the certificate of the second component in response. The second component executes the same process to complete the connection.

17 Claims, 3 Drawing Sheets

(56) References Cited

U.S. PATENT DOCUMENTS

| | | | |
|---|---|---|---|
| 2003/0188156 A1* | 10/2003 | Yasala et al. | 713/156 |
| 2004/0030888 A1* | 2/2004 | Roh et al. | 713/156 |
| 2004/0128393 A1* | 7/2004 | Blakley et al. | 709/229 |
| 2004/0168077 A1* | 8/2004 | Waxman et al. | 713/200 |
| 2005/0246770 A1 | 11/2005 | Hunt et al. | |
| 2006/0129686 A1* | 6/2006 | Tanaka | 709/229 |
| 2007/0094349 A1* | 4/2007 | Rits et al. | 709/217 |
| 2007/0171923 A1 | 7/2007 | Eisner et al. | |
| 2007/0198432 A1 | 8/2007 | Pitroda et al. | |
| 2008/0016232 A1* | 1/2008 | Yared et al. | 709/229 |
| 2008/0016336 A1 | 1/2008 | Stirbu et al. | |
| 2009/0119763 A1* | 5/2009 | Park et al. | 726/8 |
| 2009/0282242 A1* | 11/2009 | Lortz | 713/157 |
| 2011/0066849 A1* | 3/2011 | Niccolini et al. | 713/156 |

OTHER PUBLICATIONS

"Federal Bridge Certification Authority's deployment of Isode's M-Vault," 2009, retrieved from the Internet: URL:http://www.isode.com/press/case-federal-bridge.html.

"Microsoft Cross-Certificates for Windows Vista Kernel Mode Code Signing," Jun. 9, 2006, retrieved from the Internet: URL:http://www.microsoft.com//whdc/winlogo/drvsign/crosscert.mspx.

English language translation of portion of Japanese Patent Application JP2004234189 dated Aug. 19, 2004, referenced in Official Action from Japanese Patent Office in counterpart application 2012-529008, 5 pages, translated by Sugimura International Patent & Trademark Attorneys.

English language translation of Official Action dated May 28, 2013 from Japanese Patent Office in counterpart application 2012-529008, 2 pages, translated by Sugimura International Patent & Trademark Attorneys.

English language translation of relevant portions of Chinese Office Action for Chinese counterpart Application No. 2010800402936 dated Apr. 2, 2014, 7 pages, translated by Jeekai & Partners Patent Attorneys.

English language translation of relevant portions of Japanese Office Action and cited Japanese Patent JP2004234189A for Japanese counterpart Application No. 2012-529088 dated Jan. 7, 2014, 3 pages, translated by Sugimura International Patent & Trademark Attorneys.

* cited by examiner

JUST IN TIME TRUST ESTABLISHMENT AND PROPAGATION

TECHNICAL FIELD

This disclosure pertains generally to communication between computer systems across domains, and more specifically to propagating domain level trust relationships between components across multiple domains in an online service system.

BACKGROUND

In implementing secure communications between components in large online service systems (e.g., online backup systems, online reporting systems, etc.), trust needs to be established between components running in different domains or otherwise under the security jurisdiction of different servers. The secure communication layer in online service systems is often implemented using X.509 certificates, which must be signed by a Certificate Authority (CA). Trusting a CA allows a component to trust the various certificates signed by that CA, and by extension to trust other components with such signed certificates. Secure communication can occur when each component participating in the communication trusts the CA that signed the certificate of each other component.

One example of a large online service system is Veritas NetBackup (NetBackup), published by Symantec Corp. NetBackup is an enterprise level heterogeneous backup and recovery system, which provides cross-platform backup functionality across a large variety of operating systems. Each NetBackup domain is configured with a central master server which manages both Media Servers (containing the backup media) and clients. NetBackup currently recommends establishing and propagating trust relationships between components by utilizing a single, top-level CA (i.e., a Public Key Infrastructure (PKI) system) called the Root Broker (RB). Under the RB, each master server has its own CA, called an Authentication Broker (AB), whose certificate is signed by the RB. The AB then signs certificates for each component in the master server's domain. This allows for cross-domain communication to occur, which happens when a single client interacts with multiple master servers.

One common problem with this setup is that it requires a significant amount of upfront planning in order for the secure communication to work properly. It is difficult to do this planning when security infrastructure is disjoint from the application (e.g., backup) infrastructure. Without additional up-front planning for security infrastructure, an RB is typically installed alongside each master server. If the system architecture is not designed for secure communication from the beginning, an existing RB running on a master server may need to be converted to an AB underneath another master server's RB. This then requires that customers visit each system in the first master server's domain to re-establish X.509 certificates that are signed by the new AB's certificate (underneath the AB's new RB). Another possibility is for the components that perform cross-domain communication to establish trust in each other's RBs. This, again, requires visiting each system in turn that is to participate in such cross-domain communication.

Unfortunately, the above two methods for supporting cross-domain communication are rarely used in practice. This is because they require significant up-front planning, and are difficult for customers to deploy as the primary domain they are working in is that of the service (e.g., backup), not security. This problem interferes with the deployment of proper security features within a single online service system such as NetBackup. The problem is exacerbated when attempting to enable multiple, multi-domain products to communicate with one another, thereby hampering product integration.

It would be desirable to address these issues.

SUMMARY

A just in time trust propagating system propagates domain level trust relationships, in order to facilitate secure communications between components across multiple domains in an online service system, such as NetBackup. Trust relationships are established at a domain level, and propagated to components of domains as they attempt cross domain communication. For example, in the process of attempting to communicate across domains, a first component in a first domain attempts to validate a certificate of a second component in a second domain. Where the attempt to validate the certificate indicates that a trust relationship does not exist between the first component and the second domain (e.g. the first component does not have an established trust relationship with a public key infrastructure system of the second domain), the first component determines whether a domain level trust relationship exists between the first domain and the second domain. To do so, the first component can determine whether a public key infrastructure system of the first domain has an established trust relationship with the public key infrastructure system of the second domain. To make this determination, the first component can pull all of the trust relationships from the public key infrastructure system of the first domain and determine whether an established trust relationship with the second domain is among them. The first component can also make this determination by querying the public key infrastructure system of the first domain as to whether it has a trust relationship with the second domain specifically. In either case, the first component propagates the trust status between the first domain and the second domain to itself, for example by extending the pulled trust relationships of the public key infrastructure system of the first domain to itself. The first component can also perform this propagation by receiving an indication from the public key infrastructure system of the first domain that it has a trust relationship with the second domain, and extending the trust relationship with the second domain. The first component determines whether to validate the certificate of the second component responsive to the propagated trust status. In other words, where the first component extends a trust relationship with the second domain to itself, it validates the certificate of the second component in the second domain. On the other hand, where the first component does not detect a trust relationship between the first and second domains, it does not validate the certificate of the second component in the second domain. The domains can be within a single online service system or across multiple online service systems.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
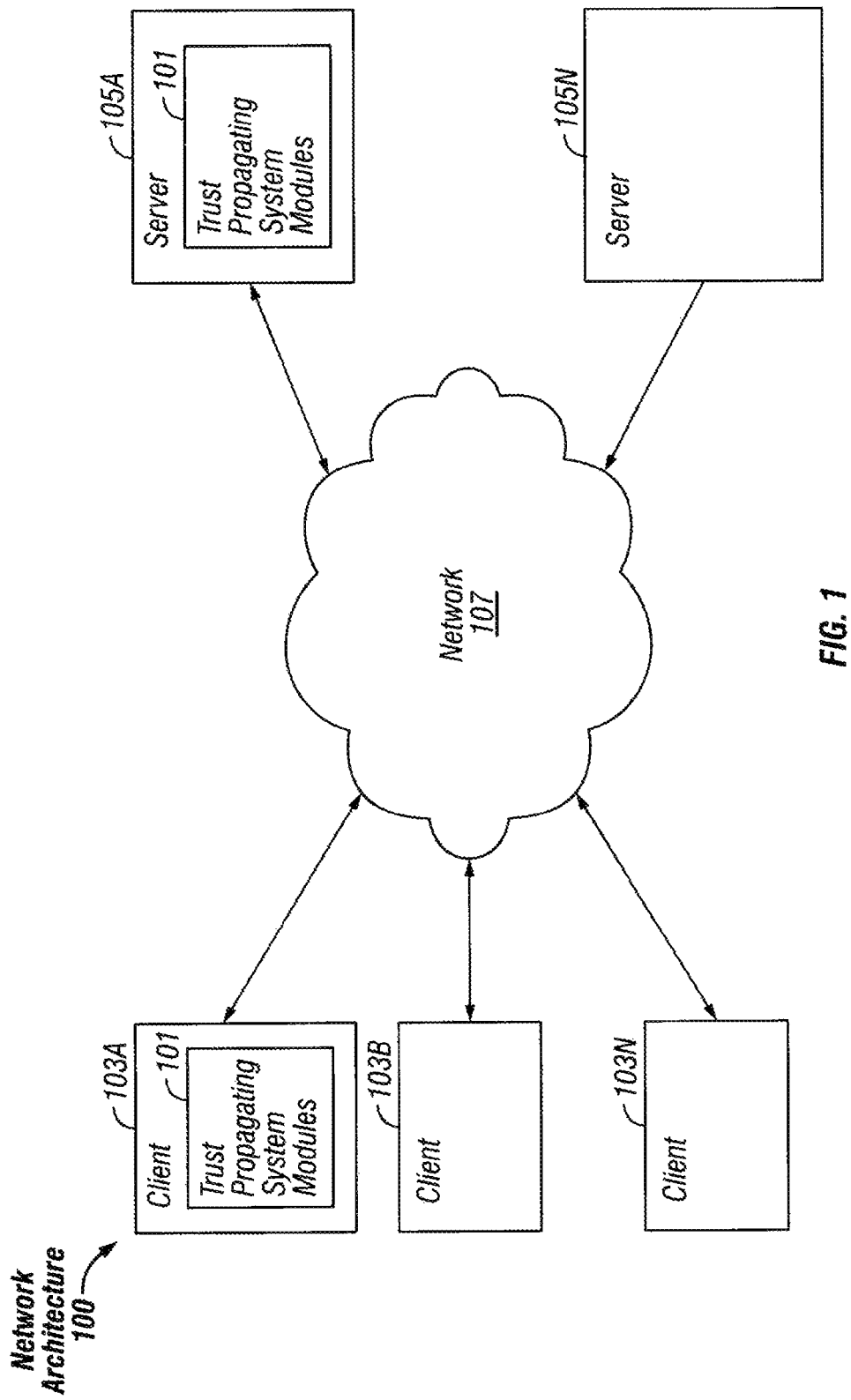
FIG. 1 is a block diagram of an exemplary network architecture in which a just in time trust propagating system can be implemented, according to some embodiments.

FIG. 1 is a block diagram illustrating an exemplary network architecture 100 in which a just in time trust propagating system 101 can be implemented. The illustrated network architecture 100 comprises multiple clients 103A, 103B and 103N, as well as multiple servers 105A and 105N. In FIG. 1, a just in time trust propagating system 101 is illustrated as being distributed between server 105A and client 103A. It is to be understood that this is an example only, and in various embodiments various functionalities of this system 101 can be instantiated on a client 103, a server 105 or can be otherwise distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of an intranet or other network architecture within an enterprise such as a corporation. In another embodiment the network 107 is in the form of the Internet.

Figure 2:
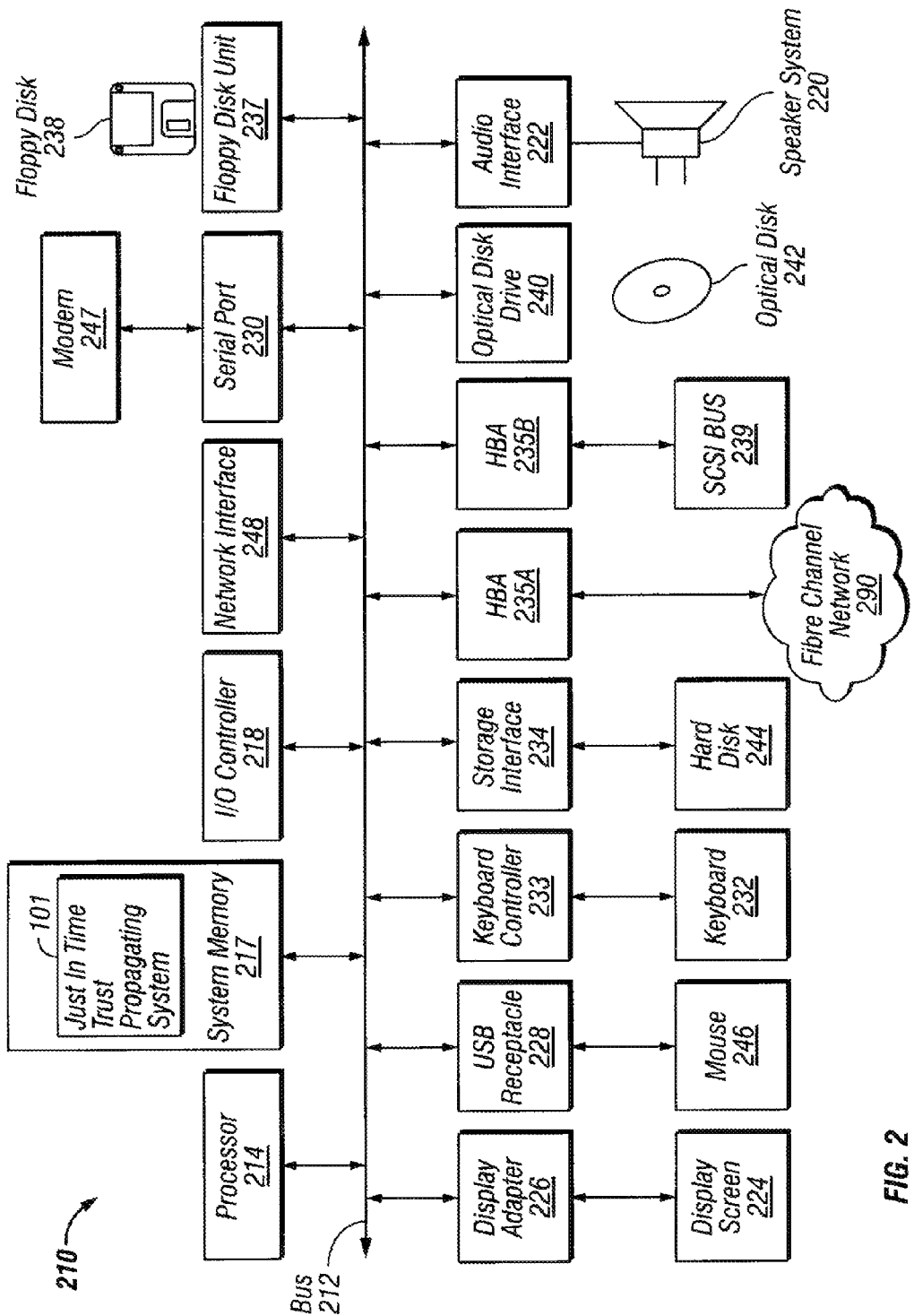
FIG. 2 is a block diagram of a computer system suitable for implementing a just in time trust propagating system, according to some embodiments.

FIG. 2 is a block diagram of a computer system 210 suitable for implementing a just in time trust propagating system 101. Both clients 103 and servers 105 can be implemented in the form of such computer systems 210. As illustrated in FIG. 2, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the just in time trust propagating system 101 is illustrated as residing in system memory 217. The workings of the just in time trust propagating system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
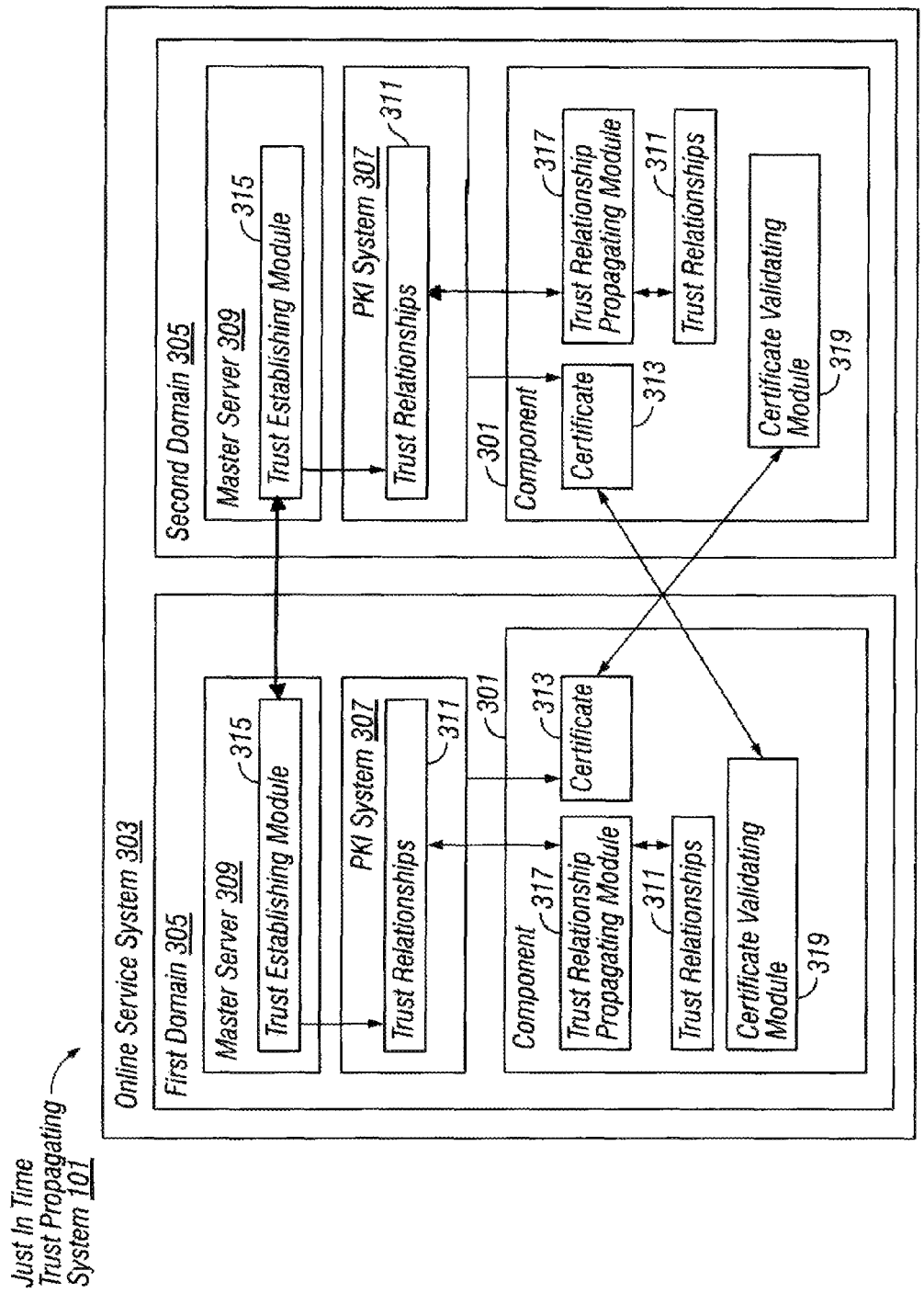
FIG. 3 is a block diagram of the operation of a just in time trust propagating system, according to some embodiments.

FIG. 3 illustrates a just in time trust propagating system residing in the system memory 217 of a computer system 210. As described above, the functionalities of the just in time trust propagating system 101 can reside on a client 103, a server 105, or be distributed between multiple computer systems 210, including within a cloud-based computing environment in which the functionality of the just in time trust propagating system 101 is provided as a service over a network 107. It is to be understood that although the just in time trust propagating system 101 is illustrated in FIG. 3 as a group of modules, the illustrated just in time trust propagating system 101 represents a collection of functionalities, which can be instantiated as a single or other multiple modules as desired. It is to be understood that the modules of the just in time trust propagating system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the just in time trust propagating system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the just in time trust propagating system 101 supports trust establishment in the context of an online service system 303 (e.g., NetBackup) across multiple domains 305. Rather than have individual components 301 across domains 305 establish trust relationships 311 with the PKI systems 307 of each other's domains 305, cross domain trust relationships 311 are established at a master server 309 level. That is, the master servers 309 establish trust relationships 311 in one another, and thus the trust between PKI systems 307 is established implicitly. It is to be understood that as the term as used herein, a master server 309 simply means a server 105 deployed in an online service system 303 at a level in a hierarchy such that it manages components 301 under a given domain 305 of that online service system 303. Although an online service system 303 can be deployed with a single domain 305 and thus a single master server 309, what is of interest herein is cross domain communication, and thus online service system 303 deployments with multiple domains 305 and thus multiple master servers 309. It is to be understood further that as used herein a component 301 simply means a computer system 210 (e.g., a media server, a client) under the jurisdiction of a master server 309 in an online service system 303.

In the methodology described herein, the distinction between an RB and an AB that exists in conventional secure cross domain communication solutions as described above disappears, and all components that sign certificates 313 are referred to herein simply as PKI systems 307. It is to be understood that as used herein a PKI system 307 simply means a computer system 210 that signs certificates 313. As illustrated in FIG. 3, a trust establishing module 315 resides on each master server 309. The trust establishing modules 315 can use conventional trust establishment functionality to establish trust relationships 311 between the master servers 309. For example, administrators (not illustrated) of given domains 305 of the online service system 303 can operate the trust establishing modules 315 (e.g., through a conventional user interface), to establish trust relationships 311 between master servers 309. It is to be understood that typically only such an administrator is granted the ability to establish or update a master server's trust relationships 311. That way, trust relationships 311 are managed at a central administrative point.

A given master server's trust relationships 311 are stored, for example, on the PKI system 307 associated with the master server 309. When trust relationships 311 are established between multiple master servers 309 (e.g., all of the master servers 309 in a multi-domain 305 online service system 303), the trust is automatically implicitly extended to the PKI systems 307 of the master servers 309. However, the components 301 of the domains 305 under these master servers 309 do not automatically know that these trust relationships 311 have been established. Therefore, it is desirable to propagate trust relationships 311 established between master servers 309 down to the components 301 that run under the jurisdiction of the master servers 309, to enable secure communication between them across domains 305.

To enable secure communication between components 301 across domains 305, trust relationships 311 are prorogated from the PKI systems 307 that signed the certificates 313 of the components 301. This propagation is implemented as a pull operation, which occurs when two components 301 from different domains 305 communicate for the first time. In general, when two components 301 wish to communication using a secure connection, the first step in establishing the communication session is for the components 301 to exchange certificates 313 to prove their identity. A certificate validating module 319 on each component 301 attempts to validate the certificate 313 of the other by identifying the signer of that certificate 313, and determining whether or not that signer is trusted. Conventionally, if the signer is not trusted then the communication attempt is terminated, and the establishment of the communication session fails. However, as illustrated in FIG. 3, in this context, if the signer of the other component's certificate is not trusted (i.e., the first component does not have an established trust relationship 311 with the PKI system 307 that signed the second component's certificate 313), then a trust relationship propagating module 317 on the first component 301 sends a request to its own PKI system 307 for its PKI system's trust relationships 311. The trust relationship propagating module 317 adds the trust relationships 311 received from the component's PKI system 307 to the component's trust relationships 311. Because the component 301 trusts its own PKI system 307, by extension it is able to trust all parties that its PKI system 307 trusts, and thus its PKI system's trust relationships 311 can be added to its own. If these pulled trust relationships 311 include a trust relationship 311 with the signer of the other component's certificate 313, the certificate validating module 319 of the first component 301 can validate that certificate 313. In some embodiments, rather than pulling all of the trust relationships 311 of the PKI system 307 in response to not being able to validate a certificate 313, the trust relationship propagating module 317 simply sends a query to the PKI system 307 asking whether it trusts the signer of the other component's certificate 313, and if so extends that trust relationship 311 to its component 301. Either way, if the first component's PKI system 307 trusts the PKI system 307 that signed the other component's certificate 311, the first component can validate the other component's certificate 313.

Trust relationship propagating module(s) 317 on either or both components 301 attempting to establish a secure communication session can pull trust relationships 313 from their respective PKI system(s) 307, in response to not being able to validate the other component's certificate 313. This can occur on either or both the client 103 and/or server 105 side of the communication, as clients 103 and servers 105 both perform certificate 313 validation and have trusted PKI systems 307. If each component 301 is able to validate the other component's certificate 313, the communication session can be established, and the components 301 can engage in cross domain communication. If one component 301 cannot validate the other component's certificate 313, then the communication attempt is terminated, and the establishment of the communication session fails. Note that this "just in time" trust propagation enables trust to be established between components 301 communicating across domains 305 without any manual user intervention.

Establishing trust relationships 311 between master servers 309 is a user-friendly way of transitively establishing trust relationships 311 across domains 305. The effect is essentially equivalent to informing one domain 305 of the intention to have another domain 305 communicate with it. That is, by establishing a trust relationship 311 between a first master server 309 in a first domain 305 and a second master server 309 in a second domain 305, the domain administrator essentially says, "Here is another domain 305 that you should know about." The trust relationships 311 of a master server 309 can be thought of as the trust relationships 311 of that master server's domain 305. By allowing the trust relationships 311 to propagate down from master servers 309 to the components 301 under their jurisdictions, trust relationships 311 between components 301 across domains 305 are established without the need to perform mass updates of trust relationships 311 for all the components 301. The trust relationships 311 are simply pulled by components 301 as needed, for actual cross domain communication. Furthermore, with the use of the just in time trust propagating system 101, it is no longer necessary to plan the security infrastructure of an online service system 303 prior to deployment. Likewise, as the deployment architecture changes over time (e.g., new domains 305 are added), it is not necessary to manually update the infrastructure to support cross-domain communication. Additionally, with conventional secure, cross-domain communication, because each component 301 must be manually updated to reflect changes in trust relationships 311, each component 301 must be running at the time of an update. Otherwise, update state information must be centrally maintained and subsequently rolled out to components 301 that were down or otherwise not available during an update. By using the just in time trust propagating system 101, on the other hand, no specific component 301 needs to be running at any given time nor does update information need to be centrally maintained, because trust relationships 311 are propagated to components 301 as needed for actual cross domain communication.

It is to be understood that the just in time trust propagating system 101 can be used as described above in the context of any online service system 303, such as but not limited to NetBackup. The just in time trust propagating system 101 can also be used as described above in the context of multiple online service systems 303 (e.g., a backup system and a reporting system), to facilitate communication across domains 305 of multiple online service systems 303.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for propagating trust relationships between components across multiple domains in at least one online service system, the method comprising the steps of:

establishing a trust relationship directly between a first master server of a first domain in an online service system and a second master server of a second domain in the online service system, wherein the trust relationship is established between public key infrastructures of different domains, and wherein the first master server manages components in the first domain and the second master server manages components in the second domain;

receiving a certificate, by a first computer system in the first domain in the online service system under management of the first master server, of a second computer system in the second domain in the online service system under management of the second master server;

attempting to validate the certificate, by the first computer system in the first domain;

determining, by the first computer system, that a trust relationship does not exist between the first computer system in the first domain and the second computer system in the second domain;

responsive to determining that a trust relationship does not exist between the first computer system in the first domain and the second computer system in the second domain, determining, by the first computer system, whether a trust relationship exists between the first master server of the first domain and the second master server of the second domain, based on an inquiry to a public key infrastructure system of the master server of the first domain;

propagating, by the first computer system, a trust status between the first domain and the second domain to the first computer system in the first domain; and determining, by the first computer system, whether to validate the certificate of the second computer system responsive to the propagated trust status;

wherein propagating, by the first computer system, the trust status between the first domain and the second domain to the first computer system in the first domain further comprises:

receiving, by the first computer system, trust relationships of a public key infrastructure system of the first domain; and extending, by the first computer system, the received trust relationships of the public key infrastructure system of the first domain to the first computer system in the first domain.

2. The method of claim 1 wherein determining, by the first computer system, that a trust relationship does not exist between the first computer system in the first domain and the second computer system in the second domain further comprises:

determining, by the first computer system, that a trust relationship does not exist between the first computer system in the first domain and the public key infrastructure system of the master server of the second domain.

3. The method of claim 1 wherein determining, by the first computer system, whether a trust relationship exists between the first master server of the first domain and the second master server of the second domain further comprises:

determining, by the first computer system, whether a trust relationship exists between a public key infrastructure system of the first domain and a public key infrastructure system of the second domain.

4. The method of claim 1 wherein determining, by the first computer system, whether a trust relationship exists between the first master server of the first domain and the second master server of the second domain further comprises:

receiving, by the first computer system, trust relationships of a public key infrastructure system of the first domain; and determining whether a trust relationship with the second domain is among the received trust relationships of the public key infrastructure system of the first domain.

5. The method of claim 1 wherein determining, by the first computer system, whether a trust relationship exists between the first master server of the first domain and the second master server of the second domain further comprises:
  querying, by the first computer system, a public key infrastructure system of the first domain as to whether it has a trust relationship with the second domain.

6. The method of claim 1 wherein propagating, by the first computer system, the trust status between the first domain and the second domain to the first computer system in the first domain further comprises:
  receiving, by the first computer system, an indication from a public key infrastructure system of the first domain that the public key infrastructure system of the first domain has a trust relationship with the second domain; and
  extending, by the first computer system, the trust relationship of the public key infrastructure system of the first domain with the second domain to the first computer system in the first domain.

7. The method of claim 1 wherein determining, by the first computer system, whether to validate the certificate of the second computer system responsive to the propagated trust status further comprises:
  responsive to extending a trust relationship of a public key infrastructure system of the first domain with the second domain to the first computer system in the first domain, validating, by the first computer in the first domain, the certificate of the second computer system in the second domain.

8. The method of claim 1 wherein determining, by the first computer system, whether to validate the certificate of the second computer system responsive to the propagated trust status further comprises:
  responsive to not detecting a trust relationship of a public key infrastructure system of the first domain with the second domain, not validating, by the first computer in the first domain, the certificate of the second computer system in the second domain.

9. The method of claim 1 wherein:
  the first domain is of a first online service system and the second domain is of a second online service system.

10. At least one non-transitory computer readable storage medium storing a computer program product for propagating trust relationships between components across multiple domains in at least one online service system, the computer program product comprising:
  program code for establishing a trust relationship directly between a first master server of a first domain in an online service system and a second master server of a second domain in the online service system, wherein the trust relationship is established between public key infrastructures of different domains, and wherein the first master server manages components in the first domain and the second master server manages components in the second domain;
  program code for receiving a certificate, by a first computer system in the first domain in the online service system under management of the first master server, of a second computer system in the second domain in the online service system under management of the second master server;
  program code for attempting to validate the certificate, by the first computer system in the first domain;
  program code for determining, by the first computer system, that a trust relationship does not exist between the first computer system in the first domain and the second computer system in the second domain;
  program code for, responsive to determining that a trust relationship does not exist between the first master server of the first domain and the second master server of the second domain, based on an inquiry to a public key infrastructure system of the master server of the first domain;
  program code for propagating, by the first computer system, a trust status between the first domain and the second domain to the first computer system in the first domain; and
  program code for determining, by the first computer system, whether to validate the certificate of the second computer system responsive to the propagated trust status;
  wherein propagating, by the first computer system, the trust status between the first domain and the second domain to the first computer system in the first domain further comprises:
    receiving, by the first computer system, trust relationships of a public key infrastructure system of the first domain; and
    extending, by the first computer system, the received trust relationships of the public key infrastructure system of the first domain to the first computer system in the first domain.

11. The computer program product of claim 10 wherein the program code for determining, by the first computer system, that a trust relationship does not exist between the first computer system in the first domain and the second computer system in the second domain further comprises:
  program code for determining, by the first computer system, that a trust relationship does not exist between the first computer system in the first domain and the public key infrastructure system of the master server of the second domain.

12. The computer program product of claim 10 wherein the program code for determining, by the first computer system, whether a trust relationship exists between the first master server of the first domain and the second master server of the second domain further comprises:
  program code for determining, by the first computer system, whether a trust relationship exists between a public key infrastructure system of the first domain and a public key infrastructure system of the second domain.

13. The computer program product of claim 10 wherein the program code for determining, by the first computer system, whether a trust relationship exists between the first master server of the first domain and the second master server of the second domain further comprises:
  program code for receiving, by the first computer system, trust relationships of a public key infrastructure system of the first domain; and
  program code for determining whether a trust relationship with the second domain is among the received trust relationships of the public key infrastructure system of the first domain.

14. The computer program product of claim 10 wherein the program code for determining, by the first computer system, whether a trust relationship exists between the first master server of the first domain and the second master server of the second domain further comprises:
  program code for querying, by the first computer system, a public key infrastructure system of the first domain as to whether it has a trust relationship with the second domain.

15. The computer program product of claim 10 wherein the program code for propagating, by the first computer system, the trust status between the first domain and the second domain to the first computer system in the first domain further comprises:

program code for receiving, by the first computer system, an indication from a public key infrastructure system of the first domain that the public key infrastructure system of the first domain has a trust relationship with the second domain; and program code for extending, by the first computer system, the trust relationship of the public key infrastructure system of the first domain with the second domain to the first computer system in the first domain.

16. The computer program product of claim 10 wherein the program code for determining, by the first computer system, whether to validate the certificate of the second computer system responsive to the propagated trust status further comprises:

program code for, responsive to extending a trust relationship of a public key infrastructure system of the first domain with the second domain to the first computer system in the first domain, validating, by the first computer in the first domain, the certificate of the second computer system in the second domain.

17. The computer program product of claim 10 wherein the program code for determining, by the first computer system, whether to validate the certificate of the second computer system responsive to the propagated trust status further comprises:

program code for, responsive to not detecting a trust relationship of a public key infrastructure system of the first domain with the second domain, not validating, by the first computer in the first domain, the certificate of the second computer system in the second domain.

* * * * *